Figure 1:
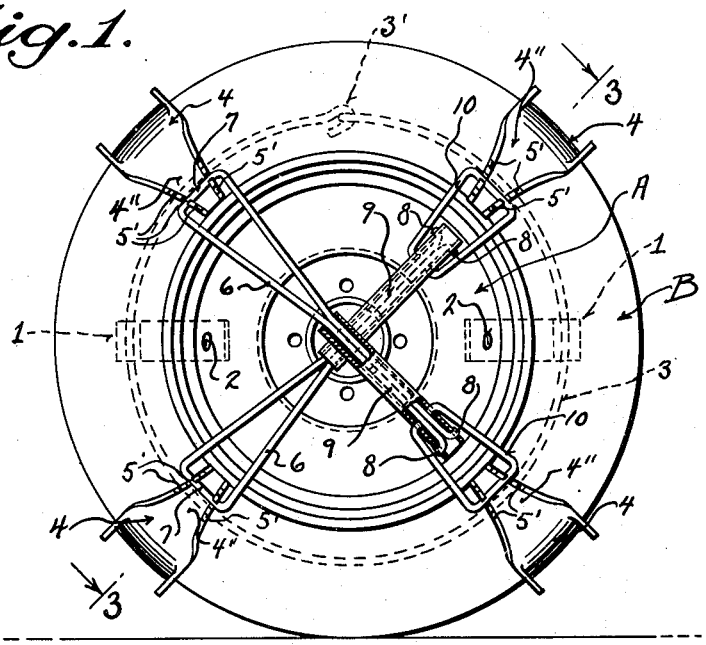

Oct. 5, 1948.   C. J. ACHENBACH   2,450,776
TRACTION SHOE ATTACHMENT FOR WHEELS

Filed Jan. 16, 1948   2 Sheets-Sheet 1

INVENTOR
CHARLES J. ACHENBACH

BY

ATTORNEYS

Oct. 5, 1948. C. J. ACHENBACH 2,450,776
TRACTION SHOE ATTACHMENT FOR WHEELS
Filed Jan. 16, 1948 2 Sheets-Sheet 2
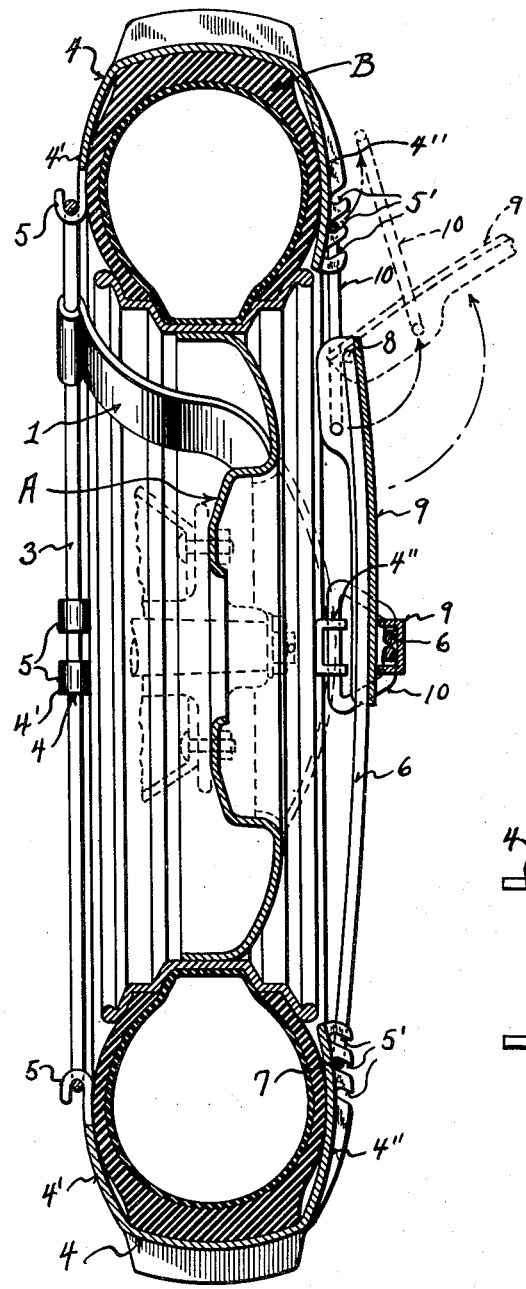
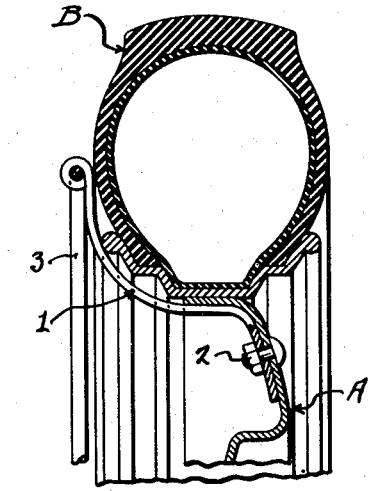
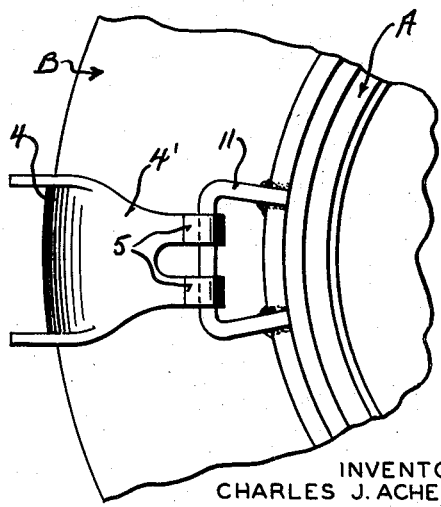
INVENTOR
CHARLES J. ACHENBACH
BY 
ATTORNEYS Patented Oct. 5, 1948

2,450,776

UNITED STATES PATENT OFFICE 2,450,776

TRACTION SHOE ATTACHMENT FOR WHEELS

Charles J. Achenbach, Manitowoc, Wis.

Application January 16, 1948, Serial No. 2,686

1 Claim. (Cl. 152—228)

My invention refers to tractor shoes for pneumatic tires, the same being provided with means for removably securing said shoes to a pneumatic tire, whereby a plurality of the shoes may be attached to the tire without jacking up a wheel.

The specific object of my invention is to provide pairs of any type of shoe, having the inner end thereof, pivotally connected to the wheel rim, the outer ends being adjustably connected in pairs, by cinch bars having a latch lever connected to one end, the opposite end being provided with a hoop connection, whereby upon actuating the latch lever, the equipment can readily be attached or removed from the wheel.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings,

Figure 1 represents a side elevation of a pneumatic tire wheel and associated shoes having a cinch bar connected embodying the features of my invention.

Figure 2:
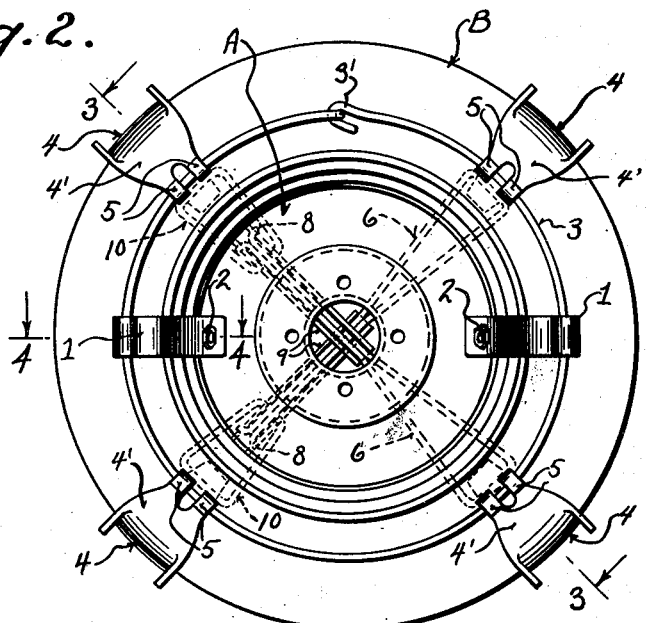
Figure 2:

Figure 2, a similar view looking towards the inner face of the wheel.

Figure 3, a cross section of the wheel, the section being indicated by line 3—3 of Figures 1 and 2.

Figure 4, a similar fragmentary cross sectional view, the section being indicated by line 4—4 of Figure 2, and Figure 5, a fragmentary elevation of a modification illustrating the inner face of the wheel having a modified form of shoe anchor attaching means.

Referring by characters to the drawings, A indicates a standard metallic webbed wheel and associated rim. Mounted upon the rim is a standard pneumatic tire B.

The web A has secured thereto a pair of straps 1, which straps for convenience are removably secured to the web by bolts 2. The opposite ends of the straps terminate with eyes for engagement with a wire hoop 3, having its ends suitably connected by a coupling eye 3', it being understood that the hoop is positioned safely below the tread of the tire, whereby under ordinary conditions, it will not engage the road when the shoes are not in use. However, in some instances I may permanently secure the anchor straps, for the hoop to the web of the wheel, by welding or other suitable means.

Mounted upon the tire tread of the wheel, is a series of traction shoes 4, having depending stirrup ends 4'—4''. The inner stirrup ends 4' terminate with hooks 5, for pivotally engaging the hanger hoop 3 and the outer saddle 4'' terminates with a series of hooks 5'—5'. The outer stirruped ends of the traction shoes, are frictionally secured to the tire, by cinch bars 6, which cinch bars are preferably formed from a stretch of wire, folded upon itself to develop a link 7, at one end and the opposite ends of the wire are bowed outwardly to form pivot toes 8, as best indicated in Figures 1 and 3 of the drawings.

Hingedly mounted upon the cinch bar toes 8 is a latch lever 9, the same being formed in U shape throughout its length, whereby it may be conveniently nested about the cinch bar, when said latch is in its closed and locked position.

The side walls of the latch lever are provided with apertures, for pivotally engaging the toes 8 of the cinch bar and at a predetermined distance below the above mentioned pivot connection, the side walls are provided with apertures, for the reception of the ends of a wire link 10.

As shown in Figure 5 of the drawings, in some instances I may substitute the continuous anchor hoop 3, for a series of wire loops 11, which wire loops may be welded to the rim of the wheel, or the same may be pivoted thereto in any suitable manner, whereby the same can be removed, when the tractor shoes are not in use. These loops 11 have pivoted thereto any type of shoe 4 and a suitable number of said loops may be employed, depending upon the road or ground conditions, where tractors or the like are employed.

From the foregoing description in order to mount a series of tractor shoes upon a wheel, the hooked ends 5 of said shoes are first pivotally mounted upon the hoop 3, it being understood that a pair of such shoes are disposed opposite each other. For example, as shown in Figure 1 of the drawings, four shoes are illustrated as a possible requirement. However, in some instances one set of these shoes may be employed.

As best indicated in Figure 1 of the drawings, a cinch bar 6 is adjusted to a pair of the stirrup hooks 5 and thereafter the cinch bar is swung against the face of the wheel and the wire link 10, as indicated in dotted lines, Figure 3, is socketed in a set of the hooks 5', it being understood that in this coupling operation the lever is in its open position, as indicated in dotted lines. After the coupling connection is effected, the latch lever is swung downwardly to the position, as indicated in full lines, Figure 3, whereby the pivot ends of the wire link will swing inwardly, beyond the latch lever pivot, thus tightly drawing the entire cinch bar unit together, whereby the pair of traction shoes are frictionally and firmly locked upon the tread of the wheel and said latch lever in this locked position is nested about the wire stretches of the cinch bar 6. It should further be understood that for convenience in avoiding the hub elements of the wheel, the cinch bars are slightly bowed outward from end to end, whereby a pair of cinch bars are folded, one over the other, at the axis of the wheel.

I claim:

In a wheel having a pneumatic tire mounted thereon a pair of traction shoes fitted over the tire having depending stirrup ends secured to the wheel, a cinch bar for the pair of shoes, comprising a wire strand folded upon itself to form a link at one end and a pair of pivot toes at the other end, a latch lever pivotally mounted upon the toes, and a wire link pivoted to the latch lever, the ends of the cinch bar being adapted to frictionally confine the tractor shoes upon a tire.

CHARLES J. ACHENBACH.

REFERENCES CITED

The following references are of record in the file of this patent:

UNITED STATES PATENTS

| Number | Name | Date |
|---|---|---|
| 1,295,669 | Addison | Feb. 25, 1919 |
| 2,146,453 | Stahl | Feb. 7, 1939 |
| 2,303,804 | Waid | Dec. 1, 1942 |